United States Patent
Takenaka et al.

(10) Patent No.: US 7,705,951 B2
(45) Date of Patent: Apr. 27, 2010

(54) LIQUID CRYSTAL DISPLAY DEVICE

(75) Inventors: Yuuichi Takenaka, Chiba (JP); Kikuo Ono, Mobara (JP)

(73) Assignee: Hitachi Displays, Ltd., Chiba (JP)

( * ) Notice: Subject to any disclaimer, the term of this patent is extended or adjusted under 35 U.S.C. 154(b) by 179 days.

(21) Appl. No.: 12/153,066

(22) Filed: May 13, 2008

(65) Prior Publication Data

US 2008/0291379 A1 Nov. 27, 2008

(30) Foreign Application Priority Data

May 18, 2007 (JP) ............................. 2007-132247

(51) Int. Cl.
G02F 1/1345 (2006.01)
(52) U.S. Cl. ...................................... 349/150; 349/149
(58) Field of Classification Search ................. 349/150, 349/149
See application file for complete search history.

(56) References Cited

U.S. PATENT DOCUMENTS 6,392,730 B2 * 5/2002 Ohta et al. .................. 349/139
2008/0198140 A1 * 8/2008 Kinoshita et al. ........... 345/173
2008/0266506 A1 * 10/2008 Takenaka et al. ........... 349/150

\* cited by examiner

Primary Examiner—Frank G Font
Assistant Examiner—Mary A El Shammaa
(74) Attorney, Agent, or Firm—Stites & Harbison PLLC; Juan Carlos A. Marquez, Esq.

(57) ABSTRACT

A liquid-crystal display device is provided which is improved in image quality by supplying a reference voltage signal to a liquid-crystal display panel through a multiplicity of distributed supply paths. The liquid-crystal display device includes a liquid-crystal display panel and a semiconductor device connected to a part of a periphery of the liquid-crystal display panel. The liquid-crystal display panel has a plurality of signal lines for supplying various signals to address pixels, on one of a pair of substrates arranged oppositely through a liquid crystal. The signal lines include a common bus line for supplying a reference voltage signal. The semiconductor device is structured with a semiconductor chip mounted on a flexible board. The flexible board at least has a line leading to a terminal for supplying a signal to the signal line of the liquid-crystal display panel through the semiconductor chip. The reference voltage signal is to be supplied to the common bus line of the liquid-crystal display panel through at least a common line formed on the flexible board of the semiconductor device. The common line on the flexible board is formed in an area outside a mount area of the semiconductor chip and in an area passing through the mount area of the semiconductor chip.

8 Claims, 4 Drawing Sheets

*FIG. 3A*     *FIG. 3B*   *FIG. 3C*
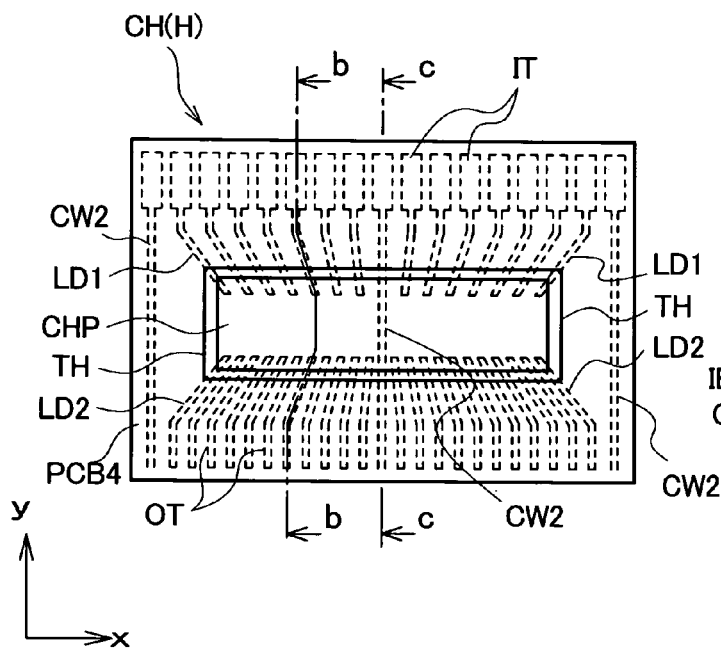
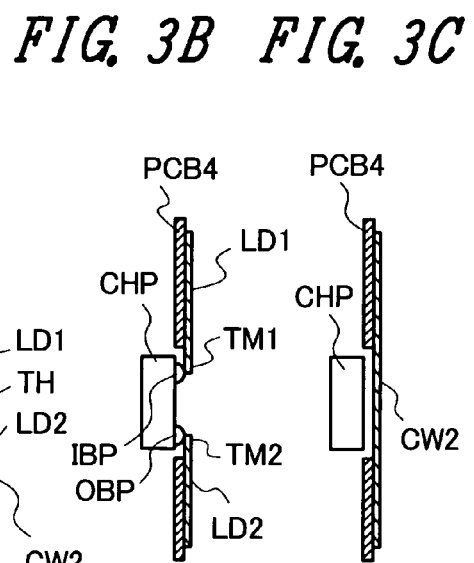
*FIG. 4*
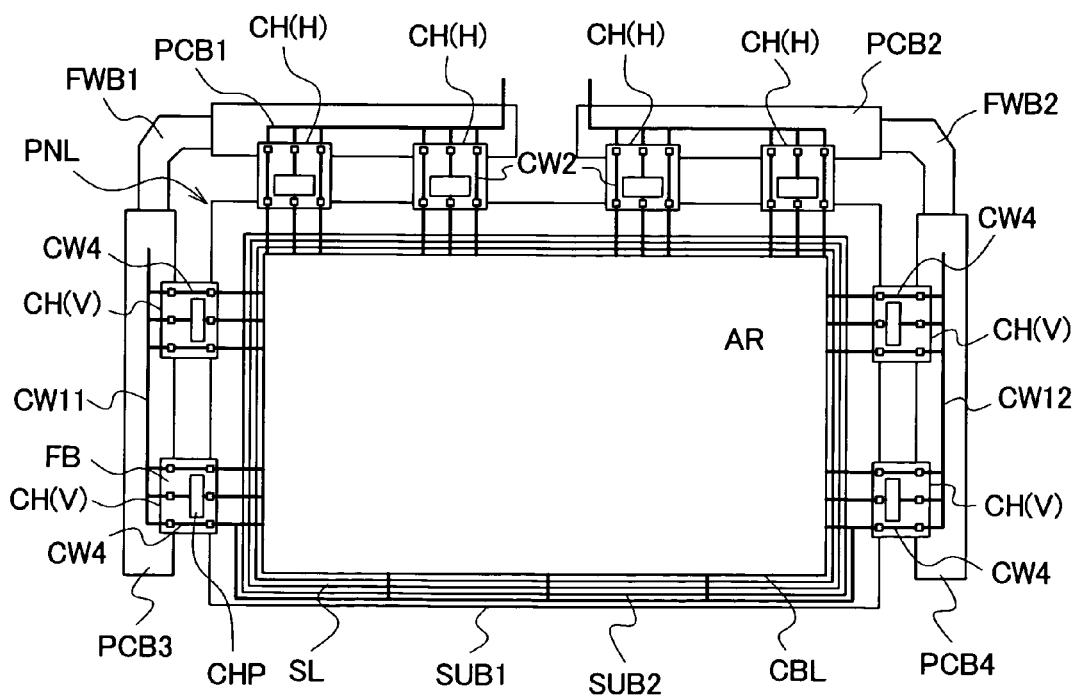

LIQUID CRYSTAL DISPLAY DEVICE

The present application claims priority from Japanese application JP2007-132247 filed on May 18, 2007, the content of which is hereby incorporated by reference into this application.

BACKGROUND OF THE INVENTION

1. Field of the Invention

The present invention relates to liquid-crystal display devices and more particularly to a liquid-crystal display device having a semiconductor device of so-called a tape carrier scheme as its drive circuit.

2. Description of the Related Art

The liquid-crystal display device of so-called an active-matrix type is structured to sequentially select the pixel columns by turning on the thin-film transistors provided at the pixels thereof according to a scanning signal supplied through the signal line and to supply, in timing with such selection, a video signal to the pixels of the relevant pixel column through the drain signal lines commonly connected to the corresponding pixels of the other pixel columns when driving the pixels of the liquid-crystal display panel.

For this reason, a scanning-signal drive circuit having a plurality of juxtaposed semiconductor devices is provided at the orthogonal side of the liquid-crystal display panel to the gate signal lines while a video-signal drive circuit having a plurality of juxtaposed semiconductor devices is provided at the orthogonal side of the liquid-crystal display panel to the drain signal lines.

As the semiconductor devices of the scanning-signal and video-signal drive circuits, there is known a structure using a semiconductor device of so-called a tape carrier scheme. The tape-carrier-schemed semiconductor device is structured by mounting a semiconductor chip on a flexible board and leading the terminals of the semiconductor chip to the periphery of the flexible board through lines.

Such a semiconductor device can be electrically connected to the corresponding terminals by connecting the flexible board at its one side portion to a part of the periphery of the liquid-crystal display panel. By bending the semiconductor device thus connected to the liquid-crystal display panel at its flexible-board portion in a manner being directed vertically to the surface of the liquid-crystal display panel, effects are to be enjoyed including so-called edge reduction.

Meanwhile, besides the scanning signal and the video signal, there is a need to supply a reference signal having a reference potential relative to those signals (hereinafter, referred to as a reference voltage signal in the present description), to the pixels of the liquid-crystal display panel. In such a situation, JP-A-2004-62201 (corresponding to U.S. Patent Application US2004/0017535), for example, discloses a technique to supply the reference voltage signal to the pixels of a liquid-crystal display panel through the lines formed on a flexible board of the semiconductor device.

Concerning the liquid-crystal display device structured as above, size increase and addressability improvement have been recently achieved in its liquid-crystal display panel. On the contrary, there arises a tendency toward decreasing the number of semiconductor devices constituting the video-signal and scanning-signal drive circuits in an effort to reduce the cost.

In this case, by reason of the increasing number of pixels with the addressability improvement of the liquid-crystal display panel, the number of terminals must be increased on the semiconductor device. Meanwhile, the reference voltage signal to be supplied to the pixels requires to be stably outputted in order for high-speed driving for the purpose of addressability improvement, size increase and moving-image quality improvement.

This is because of the reason that, where the reference voltage signal, to be supplied to the pixels, is not uniform and unstable in potential, electric field for moving the liquid-crystal molecules does not take place in a predetermined manner at each pixels thus causing poor image quality.

In order to stabilize the reference voltage signal to be supplied to the pixels of the liquid-crystal display panel, it can be considered to structurally supply a reference voltage signal to the liquid-crystal display panel through a multiplicity of distributed supply paths. However, this results in a disadvantage that the supply paths for the reference voltage signal are greatly reduced with the decreasing number of semiconductor devices.

SUMMARY OF THE INVENTION

It is an object of the present invention to provide a liquid-crystal display device that is improved in image quality by supplying a reference voltage signal to the liquid-crystal display panel through a multiplicity of distributed supply paths.

It is noted that the foregoing JP-A-2004-62201 is to be distinguished from the structure of the present invention because the on-flexible-board lines of the semiconductor device, provided for supplying a reference voltage signal to the liquid-crystal display panel, are formed in the both side areas of the semiconductor chip mounted.

The present invention provides a liquid-crystal display device comprising: a liquid-crystal display panel; and a semiconductor device connected to a part of a periphery of the liquid-crystal display panel; the liquid-crystal display panel having a plurality of signal lines for supplying various signals to address pixels, on a liquid-crystal sealed region surface at one of a pair of substrates arranged oppositely through a liquid crystal, the signal lines including a common bus line for supplying a reference voltage signal; the semiconductor device being structured with a semiconductor chip mounted on a flexible board, the flexible board at least having a line leading to a terminal for supplying a signal to the signal line of the liquid-crystal display panel through the semiconductor chip; the reference voltage signal being to be supplied to the common bus line of the liquid-crystal display panel through at least a common line formed on the flexible board of the semiconductor device; the common line on the flexible board being formed in an area outside a mount area of the semiconductor chip and in an area passing through the mount area of the semiconductor chip.

It is noted that the invention is not limited to the above structure but can be modified in various ways within the scope not departing from the technical idea of the invention.

According to the liquid-crystal display device constructed as above, a reference voltage signal can be supplied to the liquid-crystal display panel through a multiplicity of distributed supply paths, thus making it possible to improve the image quality.

BRIEF DESCRIPTION OF THE DRAWINGS

FIGS. 3A-3C are plan views showing a connection relationship of the semiconductor device, with signal lines, provided on the liquid-crystal display device according to the invention;

FIG. 4 is a plan view showing another embodiment of a liquid-crystal display device according to the invention.

DESCRIPTION OF THE PREFERRED EMBODIMENT

Description will be now made on an embodiment of a liquid-crystal display device according to the present invention by use of the drawings.

Overall Arrangement

Figure 1:
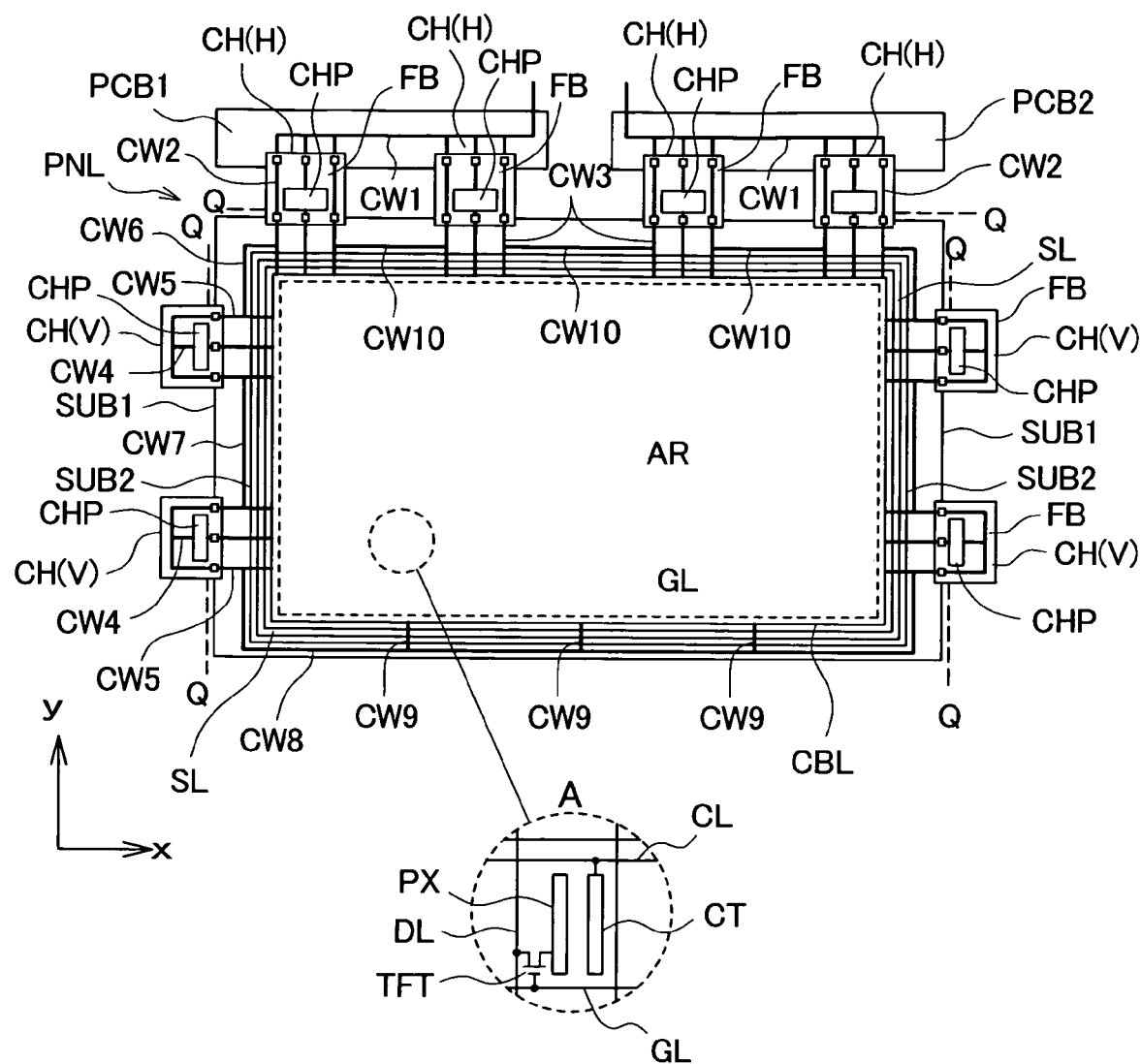
FIG. 1 is a plan view showing an embodiment of a liquid-crystal display device according to the present invention.

FIG. 1 is a schematic plan view showing an embodiment of a liquid-crystal display device according to the present invention.

First of all, there is a liquid-crystal display panel PNL. The liquid-crystal display panel PNL is structured with an envelope including a substrate SUB1 (lower substrate in the figure) and a substrate SUB2 (upper substrate in the figure) that are arranged opposite through a liquid crystal (not shown) and formed, for example, of glass.

The substrate SUB1 is made somewhat greater than the substrate SUB2. This allows the substrate SUB1 to be arranged in the state that the three sides other than the lower side for example, in the figure, are exposed comparatively great at the surfaces thereof from the substrate SUB2.

This is because semiconductor devices CH(H), i.e. a scanning-signal drive circuit, and semiconductor devices CH(V), i.e. a video-signal drive circuit, are to be connected to the three sides of the substrate SUB1.

The substrate SUB2 is fixed over the substrate SUB1 by means of a seal member SL arranged along the peripheral region of the substrate SUB2 and encapsulating the liquid crystal.

The region, surrounded by the seal member SL provided as the liquid-crystal sealed region, constitutes a liquid-crystal display area AR (shown by a dotted-lined rectangular box in the figure) in the central region thereof except for its somewhat peripheral area. The liquid-crystal display area AR is formed with a set of pixels arranged in a matrix form.

For the pixels, electric field is generated independently by the semiconductor devices CH(V), CH(H). The molecules of the liquid crystal move with respect to the pixels to thereby change the light transmittance ratio through the pixels.

For example, a backlight (not shown) is arranged in back of the liquid-crystal display panel PNL. The light from the backlight is to reach the viewer through the pixels so that the viewer can recognize a video image.

Each of the pixels is formed at a rectangular area (pixel area) surrounded by gate signal lines GL (see FIG. 2) extending in the x direction and arranged side by side in the y direction in the figure and drain signal lines DL (see FIG. 2) extending in the y direction and arranged side by side in the x direction.

As shown in the figure A shown by magnifying the dotted-lined circular region of the liquid-crystal display area AR, there are formed in the pixel region a thin-film transistor TFT to be turned on according to a signal (scanning signal) from the gate signal line GL and a pixel electrode PX to be supplied with a signal (video signal) from the drain signal line DL through the thin-film transistor TFT turned on.

The liquid-crystal display panel, directed to those of the horizontal electric-field scheme such as IPS, whose pixel is provided with a counter electrode CT arranged in the vicinity of the pixel electrode PX. The counter electrode CT is arranged to be supplied with a signal (reference voltage signal), having a potential giving a reference relative to the potential of the video signal, through a common signal line CL arranged parallel with the gate signal line GL, for example. The reference voltage signal is given as a signal inverting its polarity in order to avoid the polarization of the liquid crystal, for example.

Electric field takes place between the pixel electrode PX and the counter electrode CT in accordance with the potential difference between those. The liquid-crystal molecules are caused to move with respect to the pixels correspondingly to the value of the electric field.

In the present embodiment, the common signal line CL is connected at its both ends to a common bus line CBL. The common bus line CBL is formed in an area outer than the liquid-crystal display area AR constituted with a set of pixels and inner than the seal member SL, in a loop pattern analogous in form to the seal member SL. Because formed on the surface of a liquid-crystal seal area surrounded by the seal member SL, the common bus line cannot be given thick in its line width. Hence, it is usually structured with great electric resistance.

As apparent from the ensuing explanation, the counter electrode CT of each pixel is to be supplied with a reference voltage signal through, at least, the common bus line CBL and the common signal line CL.

In the pixel structure shown in FIG. 1, no connections are provided for the counter electrode CT of the pixel arranged vertically in the figure. However, mutual connections may be made through the lines each formed across the gate electrode GL, for example. In this case, concerning the uppermost or lowermost pixel column in the figure, the common bus line exists extending in the x direction in the figure and in the vicinity of it. For this reason, the lines corresponding to the lines to the pixels on the uppermost or lowermost pixel column may be connected to the common signal line CBL. In such a case, the relevant lines and the common bus line CL can cooperatively constitute a grid-like common signal supply line using the common bus line CBL as an outer frame.

The liquid-crystal display panel thus structured is to be connected with semiconductor devices CH(V) as a scanning-signal drive circuit and semiconductor devices CH(H) as a video-signal drive circuit, at the peripheral portions of the substrate SUB1.

The semiconductor devices CH(V), CH(H) are each formed by a plurality of semiconductor devices structured according to so-called a tape-carrier scheme. The semiconductor device CH(V), CH(H) is structured with a semiconductor chip CHP mounted on a flexible board FB. The flexible board FB has, at least, leads (lines) (not shown) for supplying signals to the signal lines (gate signal line GL, drain signal line DL) of the liquid-crystal display panel PNL through the semiconductor chip CHP.

The video-signal drive circuit H is formed, for example, by four semiconductor devices CH(H) and arranged at the upper side of the substrate SUB1 of the liquid-crystal display panel PNL, in a manner bridging to a printed-circuit board PCB arranged close to the relevant side. The printed-circuit board PCB, in this embodiment, is formed with two printed-circuit boards PCB1, PCB2 arranged side by side with respect to the lengthwise direction of the display panel PNL. Two semiconductor devices CH(H) are arranged bridging between the printed-circuit board PCB1 and the liquid-crystal display panel PNL while two semiconductor devices CH(H) are arranged bridging between the printed-circuit board PCB2 and the liquid-crystal display panel PNL.

Signals are to be supplied respectively to the printed-circuit boards PCB1, PCB2 from a not-shown control circuit (T-CON). The semiconductor devices CH(H) are driven based on the signals, to supply a video signal to the drain signal lines DL of the liquid-crystal display panel PNL.

Concerning the scanning-signal drive circuit V, two semiconductor devices CH(V) for example are connected at the left side, in the figure, of the substrate SUB1 of the liquid-crystal display panel PNL while two semiconductor devices CH(V) for example are connected at the right side, in the figure.

The gate signal lines GL are structured to be supplied with scanning signals in timing from the semiconductor devices CH(V) on the respective left and right sides, thereby avoiding the occurrence of a waveform distortion of the scanning signals. This is because of coping with the size increase of the liquid-crystal display panel PNL.

In this embodiment, the signal supply from the control circuit (T-CON) to the left semiconductor devices CH(V), in the figure, is through the printed circuit board PCB1 and the LOB (line on glass) line (not shown) formed on the left-side surface of the substrate SUB1 of the liquid-crystal display panel PNL. Likewise, the signal supply from the control circuit (T-CON) to the right semiconductor devices CH(V), in the figure, is through the printed circuit board PCB2 and the LOB (line on glass) line formed on the right-side surface of the substrate SUB1 of the liquid-crystal display panel PNL. For this reason, the semiconductor devices CH(V) as a scanning-signal drive circuit are structured not having printed circuit boards (corresponding to the printed circuit boards PCB1, PCB2 in FIG. 1) differently from the semiconductor devices CH(H) as a video-signal drive circuit.

Incidentally, in FIG. 1, out of the lines, or transfer path, for the signal to be supplied to the liquid-crystal display panel PNL, the common line only is explicitly shown to transfer the reference voltage signal without explicitly showing the lines, or transfer path, for the other signals. This is because of avoiding the complication in the figure. The common line will be described later.

Figure 2:
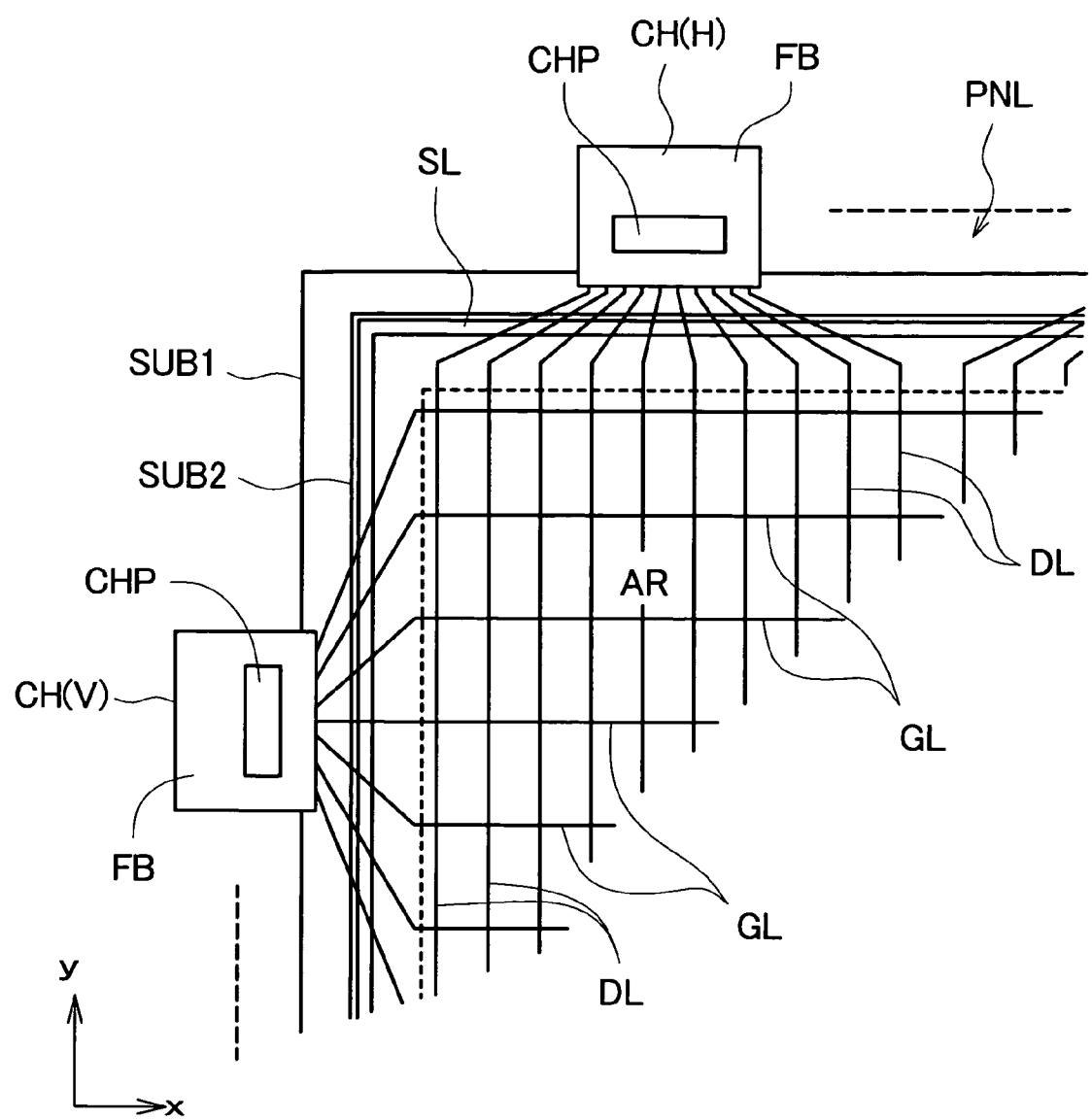
FIG. 2 is a structural view showing an embodiment of a semiconductor device provided on the liquid-crystal display device according to the invention.

FIG. 2 is a plan view showing the connection form of the semiconductor device CH(V) with the gate signal lines GL and the connection form of the semiconductor device CH(H) with the drain signal lines DL, showing the upper left portion of the liquid-crystal display panel PNL.

The gate signal lines GL in the predetermined number as counted from the uppermost are bent in a manner those converge one to another in the left end region lying beyond the liquid-crystal display area AR. Those further extend across the seal member SL and reach the terminals (not shown) on the substrate SUB1.

Those terminals are electrically connected to the output terminals of the semiconductor device CH(V) through not-shown anisotropic conductive films, in the left side region of the substrate SUB1 in the figure. Moreover, through an anisotropic conductive film, the semiconductor device CH(V) is mechanically connected also to the substrate SUB1.

This is structurally true for the other semiconductor devices CH(V), not shown, in the left side region of the substrate SUB1.

From this fact, in the case that the semiconductor devices CH(V) are provided two in the number with respect to the juxtaposing direction of the gate signal lines GL as shown in FIG. 1, one semiconductor device CH(V) has charge of a half of the total number of gate signal lines GL, to structurally supply a scanning signal to the gate signal lines GL.

The drain signal lines DL in the predetermined number as counted from the extreme left are bent in a manner those converge one to another in the upper end region lying beyond the liquid-crystal display area AR. Those further extend across the seal member SL and reach the terminals (not shown) on the substrate SUB1.

Those terminals are electrically connected to the output terminals of the semiconductor device CH(H) through a not-shown anisotropic conductive film, in the upper side region of the substrate SUB1 in the figure. Moreover, through the anisotropic conductive films, the semiconductor device CH(H) is mechanically connected also to the substrate SUB1.

From this fact, in the case that the semiconductor devices CH(H) are provided four in the number with respect to the juxtaposing direction of the drain signal lines DL as shown in FIG. 1, one semiconductor device CH(H) has charge of a quarter of the total number of drain signal lines DL, to structurally supply a video signal to the drain signal lines DL.

Referring back to FIG. 1, the reference voltage signal supplied from the not-shown control circuit (T-CON) is led to the common bus line CBL through, in order, the common line CW1 formed on the printed circuit board PCB1, the common lines CW2 formed on each semiconductor device CH(H) of the video-signal drive circuit arranged bridging between the printed circuit board PCB1 and the liquid-crystal display panel PNL and the common line CW3 formed on the surface of the substrate SUB1 of the liquid-crystal display panel PNL, from the end of the printed circuit board PCB1. This structure is similar to that at the end of the printed circuit board PCB2. Incidentally, the common lines CW1, CW2, CW3 are to be electrically connected together through the terminals (illustrated with square boxes in the figure, corresponding to the references IT and OT in FIG. 3) of the semiconductor device CH(H) when the semiconductor device CH(H) is arranged between the printed circuit board PCB1 and the liquid-crystal display panel PNL.

Here, the common lines CW2 on each semiconductor device CH(H) are structured three in the number that extend toward the liquid-crystal display panel PNL respectively through the inside of a mount area of the semiconductor chip CHP and through the both side areas of the mount area, on the flexible board FB of the semiconductor device CH(H). The feature of the present embodiment lies in the three common lines CW2 on the flexible board FB. In the existing structure, those are usually formed on the flexible board FB only at the both side areas of the semiconductor chip CHP. In the present embodiment, however, the common lines CW2 are additionally formed with one extending across the mount area of the semiconductor chip CHP. In addition, on the substrate SUB1 of the liquid-crystal display panel PNL, the common line CW3 is newly added to connect between the common line CW2 crossing the mount area and the common bus line CBL.

Due to this, the reference voltage signal supplied from the control circuit (T-CON) is conveyed to the common lines CW2, increased to three, of the semiconductor device CH(H) through the common line CW1 of the printed circuit board PCB1, PCB2. The reference voltage signal is further supplied to the common bus line CBL through the common line CW3 on the substrate SUB1 of the liquid-crystal display panel PNL.

In the structure like this, the present embodiment is allowed to provide conveyance paths for a reference voltage signal to the common bus line CBL, greater in the number than the existing structure.

Meanwhile, in each semiconductor device CH(V) of the scanning-signal drive circuit arranged for example at the left side in the figure, of the liquid-crystal display panel PNL, three common lines CW4 for example are formed on the flexible board FB thereof that extend toward the liquid-crystal display panel PNL respectively through the inside of a mount area of the semiconductor chip CHP and through the both side areas of the mount area.

In the case that the semiconductor devices CH(V) are arranged on the liquid-crystal display panel PNL as illustrated in the figure, the common lines CW4 are respectively electrically connected to the common lines CW5 formed on the substrate SUB1 of the liquid-crystal display panel PNL, through the terminals (shown with square boxes in the figure) on the semiconductor devices CH(V). The common lines CW5 are connected to the loop-patterned common bus line CBL at its portion closer to the arrangement of the semiconductor devices CH(V), in an opposite end to the connection with the semiconductor devices CH(V).

Namely, in the present embodiment, the conveyance path for a reference voltage signal to the common bus line CBL is increased greater in the number than that of the existing structure, also on the semiconductor device CH(V).

Incidentally, in this embodiment, the semiconductor devices CH(V) are structured with no printed circuit boards differently from the case of the semiconductor devices CH(H) of the video-signal drive circuit as mentioned before. The supply of a reference voltage signal to the common lines CW4 of the semiconductor devices CH(V) is by passing the reference voltage signal, outputted from the semiconductor devices CH(H) of the video-signal drive circuit, through the lines formed on the liquid-crystal display panel PNL.

Namely, a common line CW6 is formed at the upper left corner, in the figure, of the liquid-crystal display panel PNL, on the substrate SUB1 in a position between the adjacent ones of the semiconductor devices CH(H) of the video-signal drive circuit and the semiconductor devices CH(V) of the scanning-signal drive circuit. The common line CW6 has one end connected to the closer one of the common lines CW3 to the semiconductor device CH(V) and the other end connected to the closer one of the common lines CW5 to the semiconductor device CH(H).

The common lines CW4 of the semiconductor device CH(V) are formed as a pattern that is commonly connected together at a point opposite to the liquid-crystal display panel PNL with respect to its semiconductor chip CHP. Due to this, the reference voltage signal inputted from the common line CW6 is passed through all the common lines CW4 and supplied to the common bus line CBL via the common lines CW5.

Meanwhile, a common line CW7 is formed on the substrate SUB1, in a position between the semiconductor devices CH(V) of the scanning-signal drive circuit. The common line CW7 has one end connected to the closer one of the common lines CW5, connected to one semiconductor device CH(V), to the other semiconductor device CH(V) and the other end connected to the closer one of the common lines CW5, connected to the other semiconductor device CH(V), to the one semiconductor device CH(V). Due to this, the reference voltage signal is allowed to be supplied to the common bus line CBL through the common lines CW4 of the other semiconductor devices CH(V), than the closer semiconductor device CH(V) of the scanning-signal drive circuit to the semiconductor device CH(H) of the video-signal drive circuit.

This structure is similar to that of the semiconductor devices CH(V) arranged on the right side, in the figure, of the liquid-crystal display panel PNL.

Incidentally, in this embodiment, a common line CW8 is formed on the lower side of the liquid-crystal display panel PNL, one end of which is connected to the closer one of the common lines CW5, connected to the left-side semiconductor devices CH(V) in the figure, to the common line CW8 while the other end is to the closer one of the common lines CW5, connected to the right-side semiconductor devices CH(V) in the figure, to the common line CW8. This is because of the reason to lead the reference voltage signal to the lower side of the liquid-crystal display panel PNL.

The reference voltage signal, supplied through the common line CW8, is supplied to the common bus line CBL arranged close to the common line CW8 through a plurality of common lines CW9 arranged equally spaced.

A common line CW10 is formed on the upper side of the liquid-crystal display panel PNL. The common line CW10 is connected between the semiconductor devices CH(H) at their common lines CW3.

In a certain case, the semiconductor devices CH(H), CH(V), connected to the liquid-crystal display panel PNL in this manner, are bent at portions of the flexible boards FB indicated with the dotted lines Q in the figure and directed toward the backside relative to the surface of the liquid-crystal display panel PNL. This is because of achieving the edge reduction in the liquid-crystal display device.

In each of the semiconductor devices CH(H), CH(V), the common lines CW2, CW4 for leading a reference voltage signal to the liquid-crystal display panel PNL are additionally formed with one extending through the inside of the mount area of the semiconductor chip CHP thereof. Consequently, even where the semiconductor devices CH(H), CH(V) are structurally reduced in the number for a display panel whose screen is size-increased, it is possible to reduce the number of the supply paths of a reference voltage signal to the liquid-crystal display panel PNL.

Meanwhile, because the common lines CW1-CW10 are all formed outside the liquid-crystal encapsulation area (area surrounded by the seal member SL), those can be formed thicker in line width than the common bus line CBL, thus making it possible to greatly reduce the electric resistance thereof. This makes it possible to supply a reference voltage signal such that the potential is nearly equal throughout the common bus line CBL. Because the reference voltage signal can be supplied evenly to the counter electrodes of the respective pixels, image quality is to be improved.

In the embodiment, three common lines (CW2, CW4) were formed on each of the semiconductor devices CH(H), CH(V). Alternatively, the common lines in the invention may be formed four or more in the number without limited to three in the number. This allows the supply of a reference voltage signal to the common bus line CBL with greater efficiency.

Structure of the Semiconductor Device CH(H)

FIGS. 3A-3C are structural views showing an embodiment of the semiconductor device CH(H) constituting the video-signal drive circuit H, for example. FIG. 3A shows a plan view, FIG. 3B a sectional view taken along the line b-b in FIG. 3A and FIG. 3C a sectional view taken along the line c-c in FIG. 3A.

As described before, the semiconductor device CH(H) is formed according to a tape carrier scheme, wherein a semiconductor chip CHP is mounted nearly centrally on a flexible board FB formed of a resin material. The flexible board FB is structured with leads (lines) LD1, LD2 for leading signals from a plurality of input terminals IT connected to the terminals (not shown), for example, on the printed circuit board PCB1 to a plurality of output terminals OT connected to the terminals (not shown) on the liquid-crystal display panel PNL through the semiconductor chip CP.

The input terminals IT, the output terminals OT and the leads LD1, LD2 are formed on the opposite surface of the flexible board FB to the surface on which the semiconductor chip CP is mounted.

The flexible board FB is formed with a through-hole TH in an area where the semiconductor chip CP is mounted. The leads LD1, respectively connected to the input terminals IT, are formed protruding at the tips into the through-hole TH. The protrusions constitute terminals TM1 that are to be connected to the respective input bumps IBP of the semiconductor chip CP. Meanwhile, the leads LD2, respectively connected to the output terminals OT, are formed protruding at the tips into the through-hole TH. The protrusions constitute terminals TM2 that are to be connected to the respective output bumps OBP of the semiconductor chip CP.

The semiconductor chip CHP is mounted oppositely to the surface of the flexible board FB where the input terminals IT, the output terminals OT and the leads LD1, LD2 are formed, whose input bump IBP are connected to the terminals TM1 of the leads LD1 while the output bump OBP are connected to the terminals TM2 of the leads LD2.

Here, on the flexible board FB, the common lines CW2 are formed of a material similar to that of the leads LD1, LD2.

Firstly, the common lines CW2 are formed on the both side areas of a mount area of the semiconductor chip CHP and outer than the leads LD1, LD2 provided side by side, thus extending in the y direction in the figure (extending toward the liquid-crystal display panel PNL). Each of these common lines CW2 has one end connected to another input terminal IT provided parallel with the input terminals IT connected to the leads LD1 and the other end connected to another output terminal OT provided parallel with the output terminals OT connected to the leads LD2.

The common line CW2 is also located, for example, centrally of the mount area of the semiconductor chip CHP in a position between the leads LD1, LD2 provided side by side, thus extending in the y direction in the figure (extending toward the liquid-crystal display panel PNL). The relevant common line CW2 is formed bridging the through-hole TH formed in the flexible board FB, whose one end is connected to another input terminal IT provided parallel with the input terminals IT connected to the leads LD1 while the other end is connected to another output terminal OT provided parallel with the output terminals OT connected to the leads LD2.

This common line CW2 may be connected with a dummy bump free of potential on the semiconductor chip CHP.

Incidentally, although a resin material is applied covering the semiconductor chip on the surface of the flexible board FB where the semiconductor chip CP is mounted, the resin material is omitted of its depiction in FIG. 3.

Due to this, when the semiconductor device CH(H) is connected bridging between the printed circuit board PCB1 and the liquid-crystal display panel PNL for example, a reference voltage signal from the common line CW1 provided closer to the printed circuit board PCB1 can be lead to the common lines CW3 provided closer to the liquid-crystal display panel PNL through the three common lines CW2.

The semiconductor devices CH(V) are structured basically similarly to the structure shown in FIG. 3 though not shown.

Concerning the different structure as compared to the structure shown in FIG. 3, because the signal is inputted to the input terminals IT shown in FIG. 3 from the liquid-crystal display panel PNL, the input terminals IT are formed parallel with the output terminals OT shown in FIG. 3 at the side closer to the liquid-crystal display panel PNL.

The three common lines CW2 are connected common at the end thereof by means of a not-shown common line instead of forming input terminals IT to be connected thereto.

For a package structuring the semiconductor device CH(H), CH(V), a COF (chip on film) free of a through-hole is naturally suited rather than the tape-carrier-schemed one mentioned before.

Other Embodiments

FIG. 4 is a structural view showing another embodiment of a liquid-crystal display device according to the present invention, which is depicted correspondingly to FIG. 1.

The structural difference as compared to the case of FIG. 1 lies in that a printed circuit board PCB3 is arranged at the left side while a printed circuit board PCB4 is arranged at the right side wherein these sides are orthogonal to gate signal lines GL of a liquid-crystal display panel PNL.

The semiconductor devices CH(V), serving as a scanning-signal drive circuit, are connected bridging between the printed circuit board PCB3 and the liquid-crystal display panel PNL and between the printed circuit board PCB4 and the liquid-crystal display panel PNL.

Various signals, together with a reference voltage signal, are to be supplied to the printed circuit board PCB3 from the printed circuit board PCB1 through a flexible wiring board FWB1. Various signals, together with a reference voltage signal, are to be supplied to the printed circuit board PCB4 from the printed circuit board PCB2 through a flexible wiring board FWB2.

Consequently, the semiconductor device CH(V) employs the structure shown in FIG. 3, similarly to the semiconductor device CH(H) serving as a video-signal drive circuit. Input terminals IT are provided to input signals from the printed circuit board PCB3 or PCB4.

Namely, at least a common line CW11 is formed on the printed circuit board PCB3. Through the common line CW11, a reference voltage signal is supplied to the common lines (corresponding to the common lines CW4 in FIG. 3) on the semiconductor device CH(V). A common line CW12 is formed on the printed circuit board PCB4. Through the common line CW12, a reference voltage signal is supplied to the common lines (corresponding to the common lines CW4 in FIG. 3) on the semiconductor device CH(V).

From this fact, the structure does not require to form a line (e.g. common lines CW6, CW7) for leading various signals and reference-voltage signals from the printed circuit board PCB1 or PCB2 to the liquid-crystal display panel PNL, as shown in FIG. 1.

Figure 5:
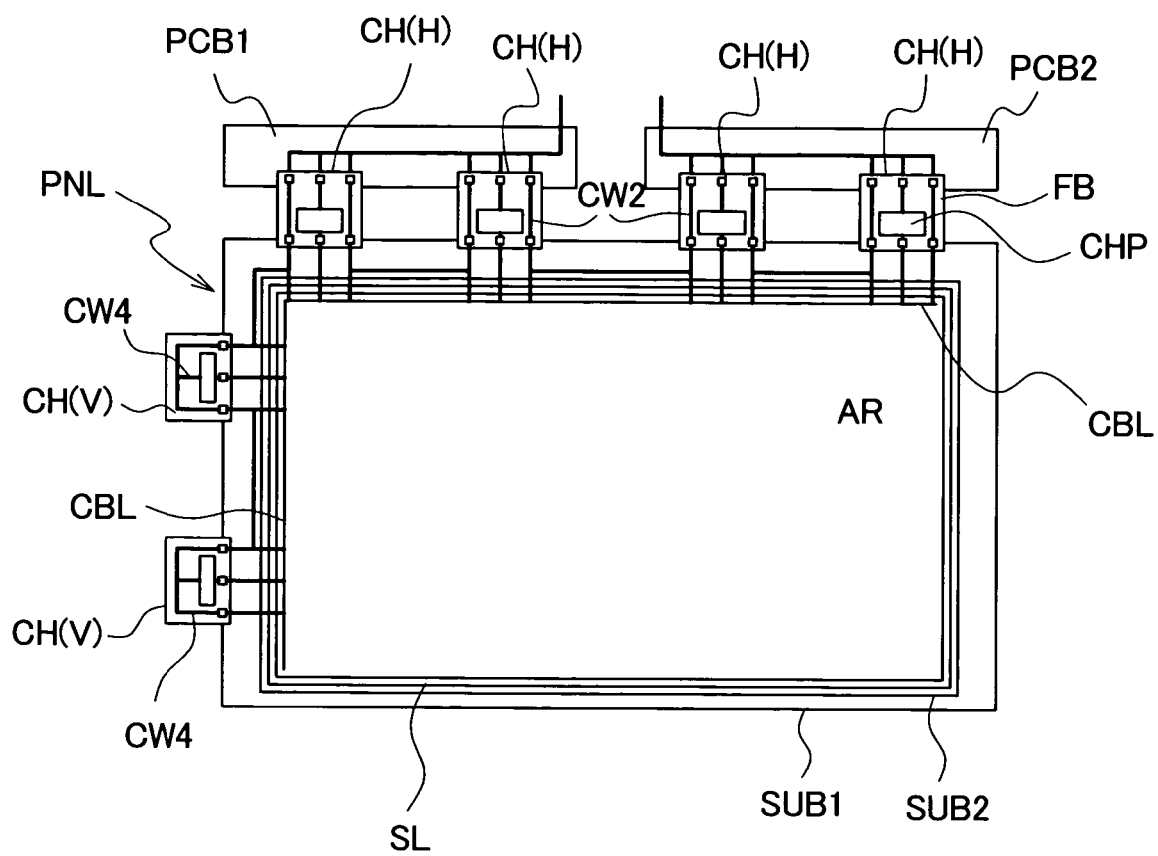
FIG. 5 is a plan view showing another embodiment of a liquid-crystal display device according to the invention.

FIG. 5 is a structural view showing another embodiment of a liquid-crystal display device according to the present invention, which is depicted correspondingly to FIG. 1.

The structural difference as compared to the case of FIG. 1 lies in that semiconductor devices CH(V) are structurally arranged only at the left side wherein the sides are orthogonal to gate signal lines GL of a liquid-crystal display panel PNL. Namely, the supply of a scanning signal to the gate signal lines GL is to be made only at one ends of the gate signal lines GL.

In this case, the common bus line CBL may be formed not in a loop pattern as shown in FIG. 1 but formed only along the side where the semiconductor devices CH(H) of the video-signal drive circuit are connected and the side where the semiconductor devices CH(V) of the scanning-signal drive circuit are connected.

The embodiments provided one line extending through the inside of a mount area of the semiconductor chip CHP out of the common lines CW2, CW4 formed on the semiconductor device CH(H), CH(V). However, this is not limitative, i.e. naturally, those may be provided two or more.

The embodiments may be used singly or in combination. This is because the effect of each embodiment can be enjoyed singly or synergistically.

What is claimed is:

1. A liquid-crystal display device comprising:
   a liquid-crystal display panel; and
   a semiconductor device connected to a part of a periphery of the liquid-crystal display panel;
   the liquid-crystal display panel having a plurality of signal lines for supplying various signals to address pixels, on one of a pair of substrates arranged oppositely through a liquid crystal, the signal lines including a common bus line for supplying a reference voltage signal;
   the semiconductor device being structured with a semiconductor chip mounted on a flexible board, the flexible board at least having a line leading to a terminal for supplying a signal to the signal line of the liquid-crystal display panel through the semiconductor chip;
   the reference voltage signal being supplied to the common bus line of the liquid-crystal display panel through at least a common line formed on the flexible board of the semiconductor device;
   the common line on the flexible board being formed in an area outside a mount area of the semiconductor chip and in an area passing through the mount area of the semiconductor chip.

2. The liquid-crystal display device of claim 1, wherein three common lines are formed on the flexible board and that pass through both side areas of the semiconductor chip and through an inside of the mount area of the semiconductor chip.

3. The liquid-crystal display device of claim 1, wherein the flexible board and the common bus line are connected by at least three common lines.

4. The liquid-crystal display device of claim 1, wherein the semiconductor chip is formed by a scanning-signal drive circuit, the flexible board mounted with the scanning-signal drive circuit having at least three points of common-line connection ends through which a reference voltage signal is inputted and outputted.

5. The liquid-crystal display device of claim 4, wherein the flexible board mounted with the scanning-signal drive circuit is connected to opposite two sides of the liquid-crystal display panel.

6. The liquid-crystal display device of claim 1, wherein the semiconductor chip is formed by a video-signal drive circuit, the flexible board mounted with the video-signal drive circuit being arranged to bridge to a printed circuit board arranged close to the liquid-crystal display panel, the flexible board having common input connection ends in at least three points for inputting a reference voltage signal from the printed circuit board and common output connection ends in at least three points for outputting the reference voltage signal to the liquid-crystal display panel.

7. The liquid-crystal display device of claim 1, including an outside-display-area common line for supplying a reference voltage signal on the substrate between the common line of the flexible board and the common bus line, and a second common bus line connecting between the outside-display-area common lines of the semiconductor devices in plurality.

8. The liquid-crystal display device of claim 7, wherein the second common bus line is not connected to the common line formed in the area passing the mount area of the semiconductor chip.

* * * * *